L. A. SCRIBNER.
COUPLING.
APPLICATION FILED APR. 22, 1915.
1,248,558. Patented Dec. 4, 1917.
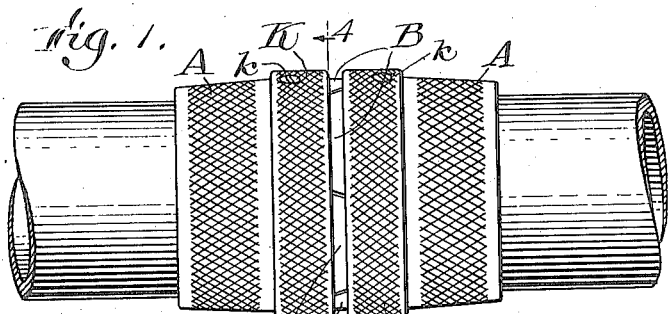
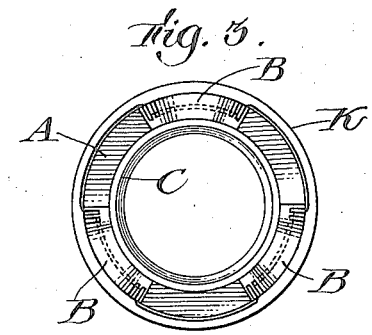
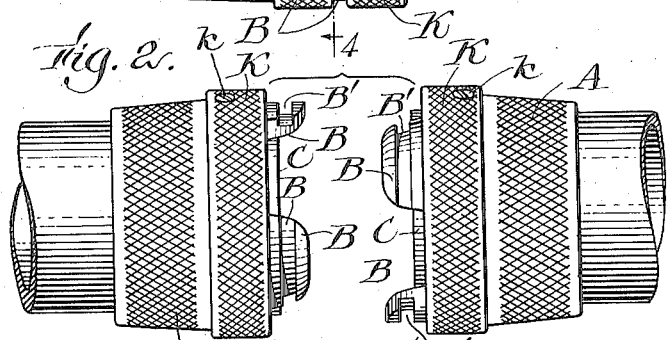
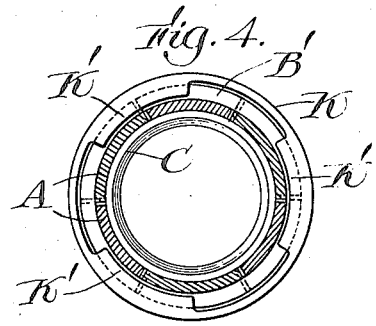
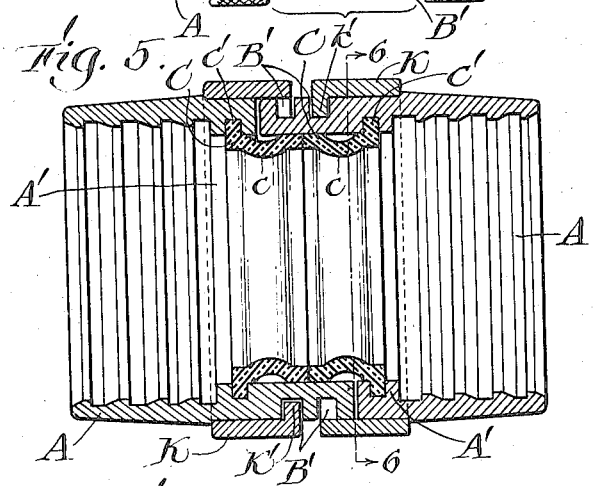
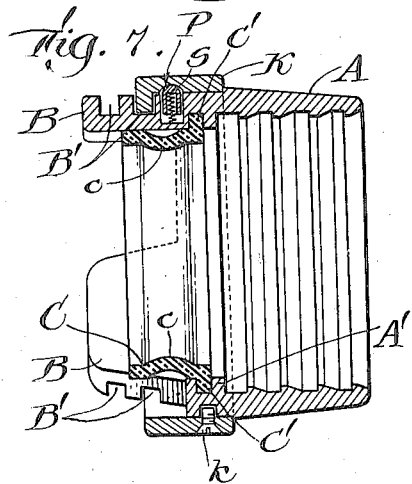
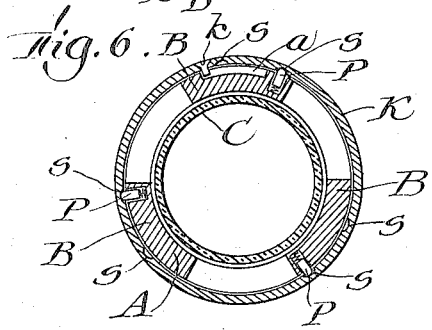
Witnesses:
Josephine H. Ryan
R. M. Banfield
Inventor:
Leon A. Scribner,
by Robert Robert Cushman
Attorneys

UNITED STATES PATENT OFFICE.

LEON A. SCRIBNER, OF NEWPORT, NEW HAMPSHIRE.

COUPLING.

1,248,558.  Specification of Letters Patent.  Patented Dec. 4, 1917.

Application filed April 22, 1915. Serial No. 23,237.

*To all whom it may concern:*

Be it known that I, LEON A. SCRIBNER, a citizen of the United States, and resident of Newport, in the county of Sullivan and State of New Hampshire, have invented new and useful Improvements in Couplings, of which the following is a specification.

This invention relates to couplings for hose and the like, and its object is to provide a coupling wherein the two members can be readily connected and disconnected and a tight joint or seal made and maintained between them.

Referring to the drawings which illustrate an embodiment of my invention,—

Figure 1 is a side elevation of my improved coupling with its two members united;

Fig. 2 is a similar view of the two members separated and in position to be united;

Fig. 3 is an end view of one of the coupling members;

Fig. 4 is a section on the line 4—4, Fig. 1;

Fig. 5 is a central longitudinal section of the two members united;

Fig. 6 is a section on the line 6—6, Fig. 5; and

Fig. 7 is a section of a coupling member through one of the locking pins.

The two coupling members are of identical construction and it will therefore be necessary to describe but one. Each consists of a tubular head A and an operating ring or collar K rotatably mounted thereon. The head A is provided on one end with a plurality of interlocking projections B spaced apart and each having a pair of annular grooves B'. In the form shown three such locking projections B are provided, and preferably as shown their sides are all inclined, preferably at the same angle and their tops rounded (Fig. 2). The said head is further provided with an internal annular flange A' having a groove to receive and hold the gasket C hereinafter described, and also has a shallow external groove $a$ and recesses from which project spring pressed pins or catches P.

The operating ring or collar K is sleeved over the end of the head A and is provided with inwardly extending locking segmental annular flanges K', K' one for each locking projection B. The said segmental flanges K' are of substantially the same length as the segment defined by the lowermost groove B' of the locking projections B in which they are adapted to be housed when the coupling members are unlocked.

Mounted on said collar K and projecting into said groove $a$ is a stop $k$ which limits the rotation of said collar on said head, and sockets S are provided on the inner face of said collar to receive said pins P yieldingly to secure said operating collar and said head. Two sockets S are provided for each pin P, one to receive the pin when the coupling is locked and the other when it is unlocked.

C is a gasket of any suitable compressible material, preferably rubber, having a flange C' adapted to be held within said flange A' and a weakened portion, as at $c$, to permit it readily to crush and bulge inward at said weakened portion when the members are united as shown in Fig. 5. When in normal unlocked position (Fig. 7) the top of the gasket projects above the plane of the lowermost slots B' of the locking fingers.

In coupling or uniting the members they are placed in the position shown in Fig. 2 with the locking projections of one member opposite the spaces between the corresponding locking projections of the other member. The two members are then brought together until the grooves B' of the locking projections are in register. Owing to the inclined sides of the locking projections, the members may be brought together at a large axial angle to each other and then be straightened into contact. No pressure endwise of the coupling is required to bring the members into mating position except enough pressure slightly to deform the freely yielding gaskets C, C. When the slots have been thus brought into register the operating collars K of the respective members are rotated one to the right and the other to the left, causing the locking flanges K' of each member to leave their grooves B' and enter the corresponding grooves B' of the other member, thus firmly locking the parts, the operating collar being yieldingly held in locked position by entrance of the pins P into the sockets S provided for that purpose.

The operating collars K having flanges K' are easily rotated because of the slight stress tending to separate the coupling members. It will be observed that when the members are locked together the locking projections B together form a complete cylinder (Fig. 1) and that each segmental flange K' stands across the abutting inclined faces of two locking projections B and partly in the annular groove B' of each of the abutting projections. In this position the members cannot be separated without shearing apart all of the flanges K'. The operating collar K by this device is under no stress with respect to the member upon which it is mounted, is called upon to act neither as a screw or a cam, and is sufficiently attached to the coupling by the light stops k, thus avoiding a second machined flange and bearing for the operating collar, and enabling the parts to be loosely fitted for free movement by hand, as well as providing a very strong joining with respect to longitudinal or bending stresses.

As the gaskets C are higher than the lowermost grooves B' of the locking projections, the bringing of said grooves into register as above described causes the gaskets C to abut and to be lightly compressed, so that the weakened portions c buckle inward as best shown in Fig. 5. It will, I believe, be apparent that the joint thus made between the sealing faces of the gaskets is a very tight one when subjected to internal pressure by reason of the inward bulge of the gaskets, the pressure of the fluid passing through the coupling tending to press and hold the sealing faces of the gaskets in intimate contact.

A coupling constructed in accordance with my invention as above described is simple, insures a tight joint between the members and can be readily locked and unlocked under all the difficult conditions of service commonly encountered in the use of these devices.

I claim:

1. A coupling comprising a tubular section having projections with two external annular grooves therein, said member having thereon a rotatable operating collar bearing segments of an annular flange adapted to be housed in the grooves of said projections of said members in one position.

2. A coupling comprising like tubular matting sections each having projections with two external grooves therein adapted to form continuous annular grooves when the members are juxtaposed, each member having thereon a rotatable operating collar bearing internally projecting segments of an annular flange adapted to be housed in the grooves of said projections of said members in one position, and in the grooves of two adjacent projections of different members in another position.

3. A coupling comprising two members having gaskets adapted to abut and form a seal when said members are united, and means to lock said members together comprising segmental locking projections having a plurality of annular grooves and operating collars having segmental annular locking flanges adapted to be rotated in said grooves in said locking projections.

4. A coupling comprising two members each having a tubular head provided with locking projections spaced apart and having a pair of transverse grooves, a gasket, and an operating collar rotatably mounted on said head and having in-turned flanges normally housed in one of the grooves of said projections, said gaskets being adapted to abut to form a seal when said members are united with the grooves of the locking projections of one member in register with the corresponding grooves of the other member.

5. A coupling comprising two members, each having a tubular head provided with locking projections spaced apart and having a pair of transverse grooves, a gasket having a weakened portion, an operating collar rotatably mounted on said head and having inturned flanges normally resting in one of the grooves of said projections, said gaskets adapted to abut and bulge inward at said weakened portions to form a seal when the said members are united with the grooves of the locking projections to one member in register with the corresponding grooves of the other member.

6. A coupling comprising two members, means to lock said members together comprising segmentary locking projections having a plurality of annular grooves and operating collars having segmental annular locking flanges adapted to be rotated in said grooves in said locking projections.

Signed by me at Newport, New Hampshire, this fifteenth day of April, 1915.

LEON A. SCRIBNER.

Witnesses:
JOHN MCCRILLIS,
EDNA L. CHAMBERLAIN.